United States Patent
Bar-On et al.

(10) Patent No.: US 11,259,051 B2
(45) Date of Patent: Feb. 22, 2022

(54) PYRAMID ALGORITHM FOR VIDEO COMPRESSION AND VIDEO ANALYSIS

(71) Applicant: NUMERI LTD., Haifa (IL)

(72) Inventors: Ilan Bar-On, Haifa (IL); Oleg Kostenko, Haifa (IL)

(73) Assignee: NUMERI LTD., Haifa (IL)

( * ) Notice: Subject to any disclaimer, the term of this patent is extended or adjusted under 35 U.S.C. 154(b) by 268 days.

(21) Appl. No.: 16/300,986

(22) PCT Filed: May 14, 2017

(86) PCT No.: PCT/IB2017/052834
§ 371 (c)(1),
(2) Date: Nov. 13, 2018

(87) PCT Pub. No.: WO2017/199149
PCT Pub. Date: Nov. 23, 2017

(65) Prior Publication Data
US 2020/0314451 A1 Oct. 1, 2020

Related U.S. Application Data

(60) Provisional application No. 62/336,770, filed on May 16, 2016.

(51) Int. Cl.
*H04N 19/61* (2014.01)
*H04N 19/59* (2014.01)

(52) U.S. Cl.
CPC ............ *H04N 19/61* (2014.11); *H04N 19/59* (2014.11)

(58) Field of Classification Search
None
See application file for complete search history.

(56) References Cited

U.S. PATENT DOCUMENTS 4,982,283 A * 1/1991 Acampora ........... H04N 19/503
375/240.12
5,150,209 A * 9/1992 Baker ..................... G06T 9/008
375/240.02
(Continued)

FOREIGN PATENT DOCUMENTS

WO  9118477 A1  11/1991
WO  2014053982 A2  4/2014
(Continued)

OTHER PUBLICATIONS

International Search Report in PCT/IB2017/052834 dated Aug. 22, 2017.
(Continued)

*Primary Examiner* — Stefan Gadomski
(74) *Attorney, Agent, or Firm* — Manelli Selter PLLC; Edward Stemberger

(57) ABSTRACT

A method of representing image data comprising a spatial pyramid data structure of order L, said method comprising: providing an initial representation of said image data, said representation comprising a set of lattices of level 0; connecting each said lattices of level 0 to said image data; performing L reduction steps each comprising: for each one of at least one current lattice of the current level, optionally blurring said current lattice; providing a plurality of down sampled sub-lattices of said current optionally blurred lattice, said at least one current lattice being the parent lattice of said respective plurality of down sampled sub-lattices; and connecting said plurality of down sampled sub-lattices to said respective parent lattice, wherein said plurality of down sampled sub-lattices of the current level, comprise the set of current lattices for the next level.

9 Claims, 13 Drawing Sheets

700 An example of a complete Spatial Pyramid with L=2, N=2 and q=½.

(56) References Cited

U.S. PATENT DOCUMENTS

| | | | | |
|---|---|---|---|---|
| 5,398,068 | A * | 3/1995 | Liu | H04N 19/56 348/699 |
| 5,598,217 | A * | 1/1997 | Yamaguchi | H04N 19/63 375/240.21 |
| 5,898,798 | A * | 4/1999 | Bouchard | H04N 19/63 382/242 |
| 6,674,911 | B1 * | 1/2004 | Pearlman | G06T 9/40 375/240.19 |
| 8,115,780 | B2 * | 2/2012 | Goda | G06T 15/503 345/611 |
| 2001/0011290 | A1 | 8/2001 | Kovacevic et al. | |
| 2001/0035916 | A1 * | 11/2001 | Stessen | H04N 5/21 348/607 |
| 2003/0198395 | A1 * | 10/2003 | Lynch | H04N 19/61 382/240 |
| 2003/0228064 | A1 * | 12/2003 | Gindele | G06T 5/50 382/260 |
| 2003/0231797 | A1 * | 12/2003 | Cullen | H04N 19/147 382/239 |
| 2004/0120594 | A1 * | 6/2004 | Vitali | H04N 19/60 382/251 |
| 2004/0264799 | A1 * | 12/2004 | Gallagher | G06T 3/4007 382/265 |
| 2005/0063472 | A1 * | 3/2005 | Vella | H04N 19/60 375/240.22 |
| 2006/0067573 | A1 * | 3/2006 | Parr | G06K 9/00 382/154 |
| 2006/0262994 | A1 * | 11/2006 | Patera | H04N 19/119 382/276 |
| 2008/0131011 | A1 * | 6/2008 | Le Leannec | H04N 19/39 382/238 |
| 2008/0253678 | A1 * | 10/2008 | Li | H04N 19/33 382/260 |
| 2009/0313662 | A1 * | 12/2009 | Rodriguez | H04N 19/46 725/87 |
| 2010/0142790 | A1 * | 6/2010 | Chang | G06T 5/009 382/132 |
| 2010/0183071 | A1 * | 7/2010 | Segall | H04N 5/2355 375/240.16 |
| 2010/0231593 | A1 * | 9/2010 | Zhou | H04N 19/537 345/428 |
| 2010/0246982 | A1 * | 9/2010 | Petrov | G06T 9/00 382/232 |
| 2010/0272191 | A1 * | 10/2010 | Dorea | H04N 19/46 375/240.29 |
| 2011/0026819 | A1 * | 2/2011 | Lee | H04N 19/147 382/166 |
| 2011/0058752 | A1 | 3/2011 | Prakash et al. | |
| 2011/0170615 | A1 * | 7/2011 | Vo | H04N 19/59 375/240.26 |
| 2011/0182515 | A1 * | 7/2011 | Iwai | G06K 9/4676 382/190 |
| 2011/0182516 | A1 * | 7/2011 | Iwai | G06K 9/6256 382/190 |
| 2011/0229025 | A1 * | 9/2011 | Zhao | G06K 9/4671 382/165 |
| 2012/0008689 | A1 * | 1/2012 | Nasu | H04N 19/53 375/240.16 |
| 2012/0093221 | A1 * | 4/2012 | Rodriguez | H04L 65/607 375/240.13 |
| 2013/0113884 | A1 * | 5/2013 | Leontaris | H04N 19/186 348/43 |
| 2013/0343664 | A1 * | 12/2013 | Kobayashi | H04N 19/50 382/233 |
| 2014/0177706 | A1 * | 6/2014 | Fernandes | G06T 3/4053 375/240.03 |
| 2015/0055844 | A1 * | 2/2015 | Molin | G06T 3/4053 382/131 |
| 2015/0256837 | A1 * | 9/2015 | Bar-On | H04N 19/184 375/240.02 |
| 2015/0324660 | A1 | 11/2015 | Stein et al. | |
| 2015/0355353 | A1 * | 12/2015 | Whitaker | G01V 1/345 702/14 |
| 2016/0148346 | A1 * | 5/2016 | Bar-On | H04N 19/59 348/441 |

FOREIGN PATENT DOCUMENTS

| | | |
|---|---|---|
| WO | 2014207643 A1 | 12/2014 |
| WO | 2016005844 A1 | 1/2016 |

OTHER PUBLICATIONS

International Preliminary Report on Patentability in PCT/IB2017/052834 dated Oct. 13, 2018.

Wikipedia, "Embedded Zerotrees of Wavelet Tranforms", obtained from the Internet at https://en.wikipedia.org/wiki/Embedded_Zerotrees_of_Wavelet_transforms, on Nov. 7, 2018.

Wikipedia, "Moving Picture Experts Group", obtained from the Internet at https://en.wikipedia.org/wiki/Moving_Picture_Experts_Group, on Nov. 7, 2018.

Wikipedia, "Optical Flow", obtained from the Internet at https://en.wikipedia.org/wiki/Optical_flow, on Nov. 7, 2018.

* cited by examiner

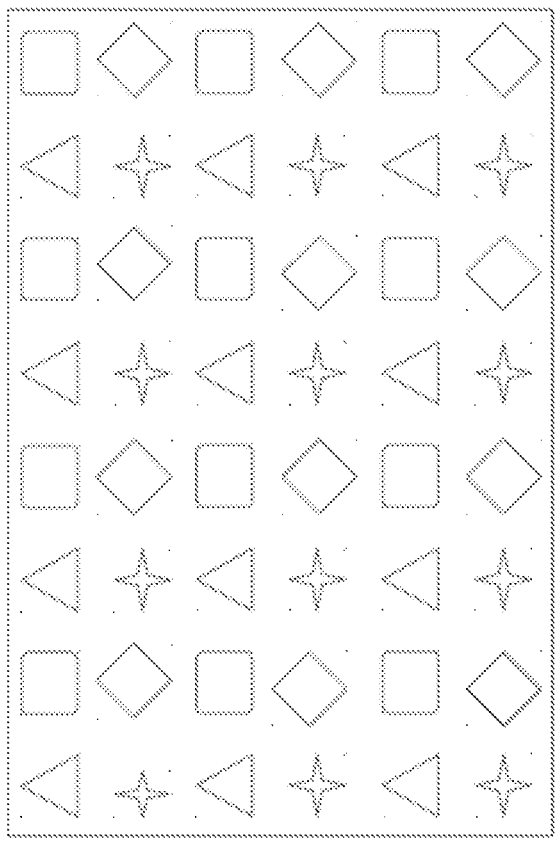
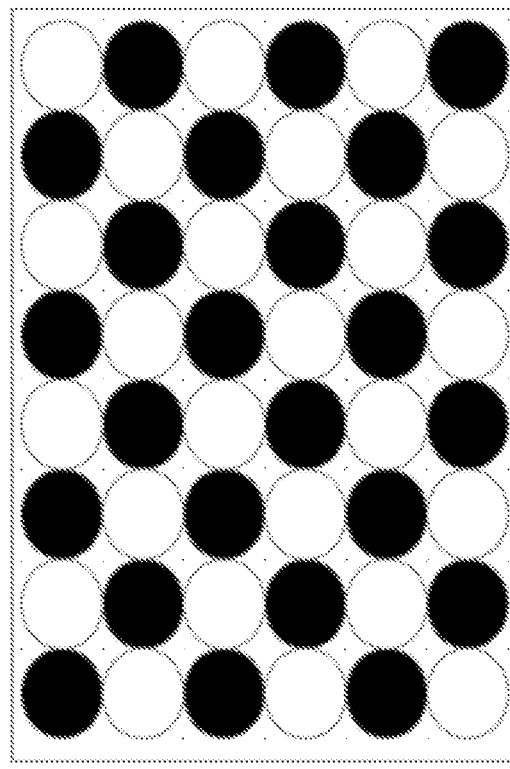
110 The four Dyadic sub-lattices.
120 The two Quincunx sub-lattices.
100 A frame lattice and some of its sub-lattices.
FIG. 1 (PRIOR-ART)

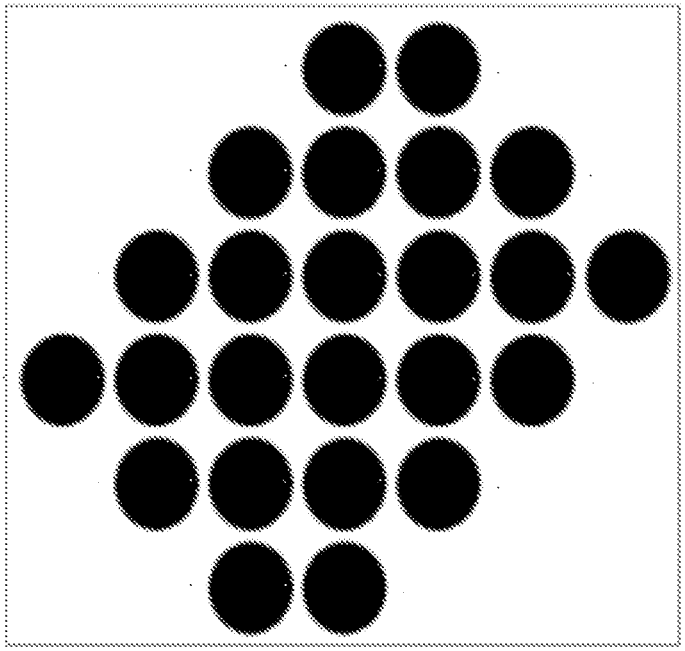
220 The rotated Quincunx-Even sub-lattice.
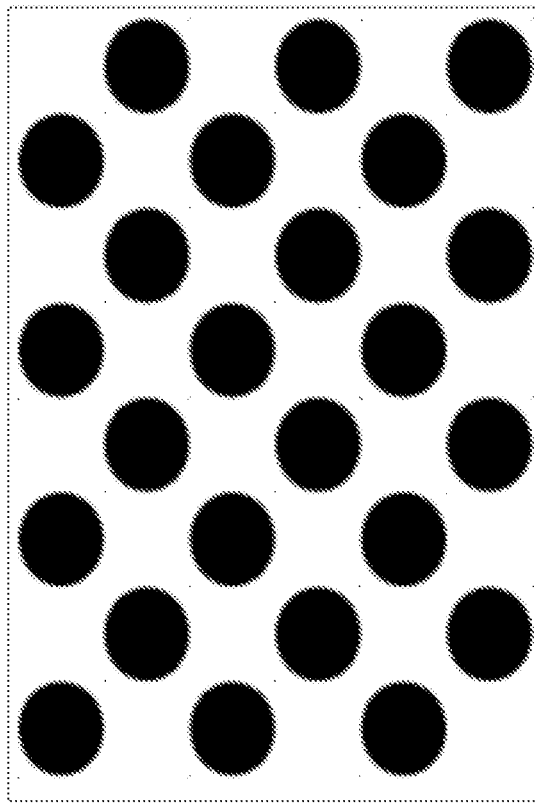
210 The unrotated Quincunx-Even sub-lattice.
200 The Quincunx-Even sub-lattice.
FIG. 2 (PRIOR-ART)

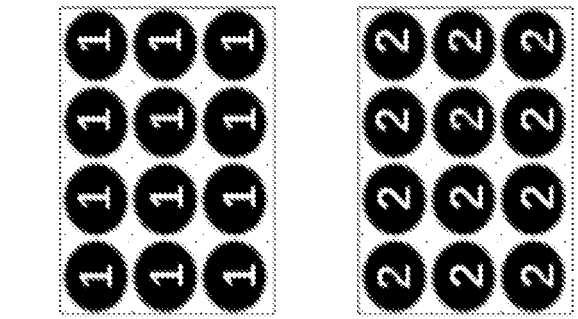
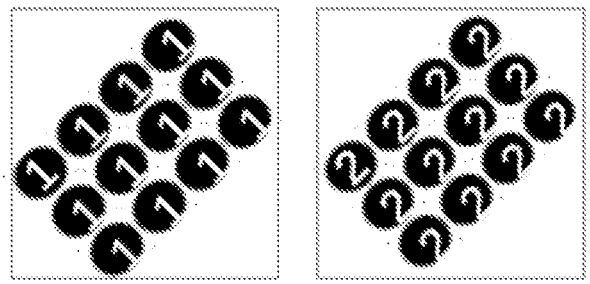
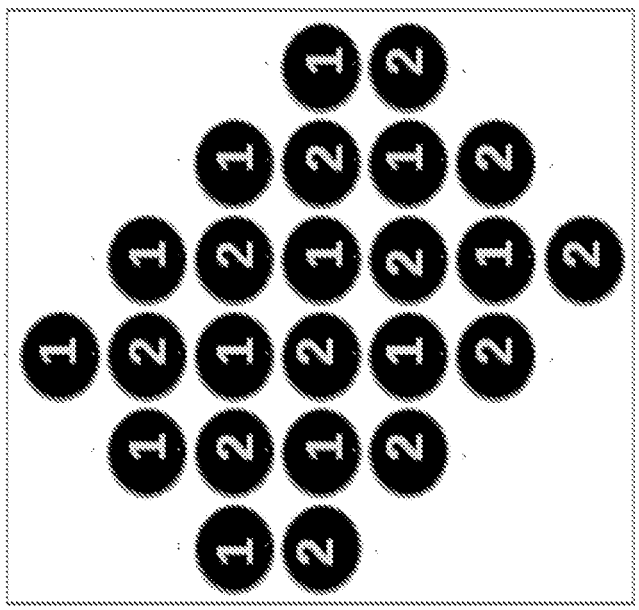
FIG. 3 (PRIOR-ART)

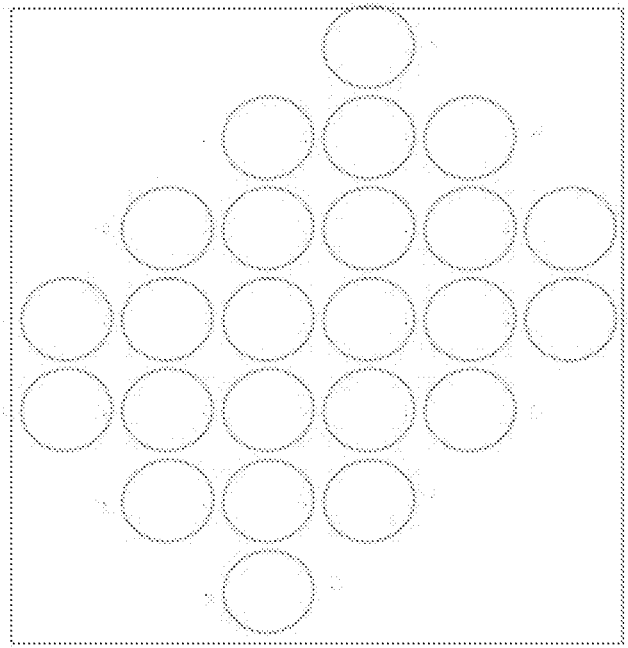
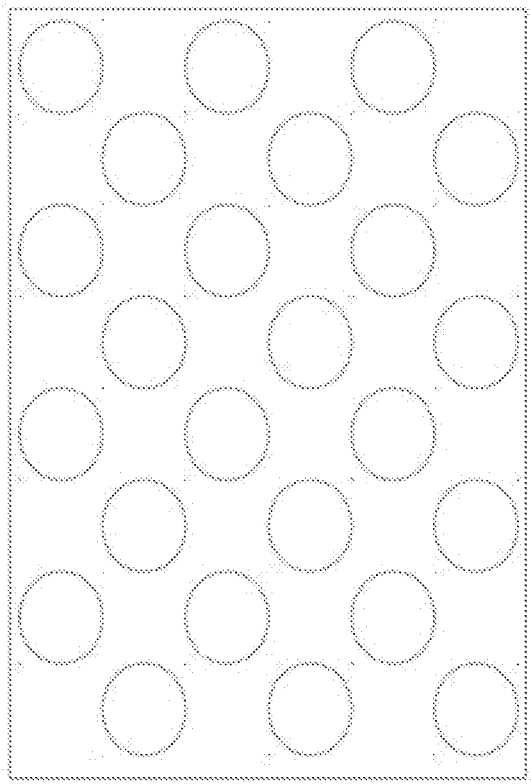
420 The rotated Quincunx-Odd sub-lattice.
410 The unrotated Quincunx-Odd sub-lattice.
400 The Quincunx-Odd sub-lattice.
FIG. 4 (PRIOR-ART)

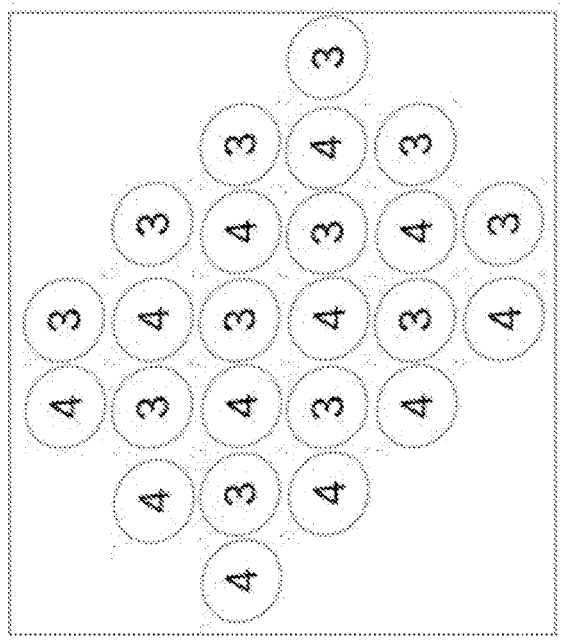
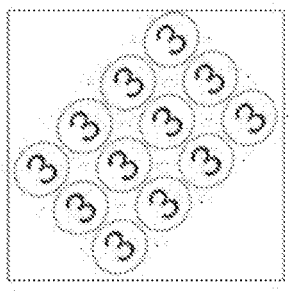 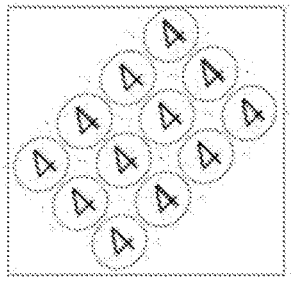
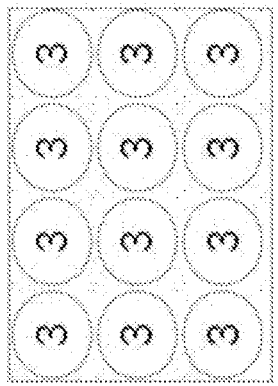 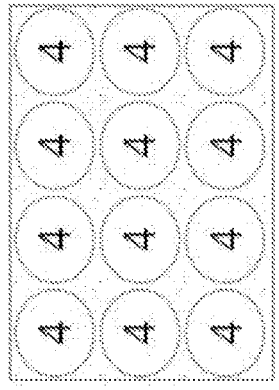
510 The rotated Quincunx-Odd's sub-lattices.
520 The rotated Quincunx-Odd-Even and the rotated Quincunx-Odd-Odd sub-lattices.
530 The unrotated Quincunx-Odd-Even and the unrotated Quincunx-Odd-Odd sub-lattices.
500 The Quincunx-Odd's sub-lattices.
FIG. 5 (PRIOR-ART)

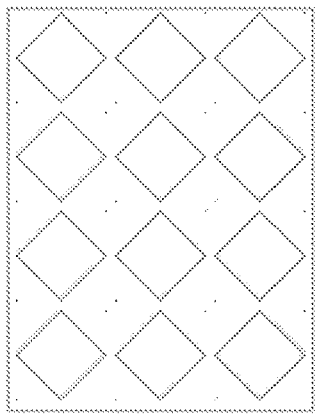
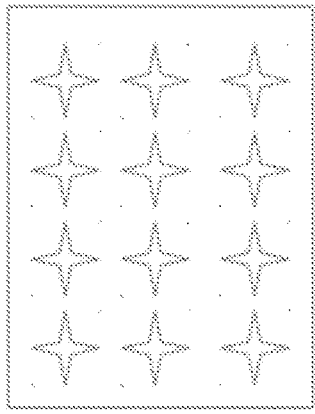
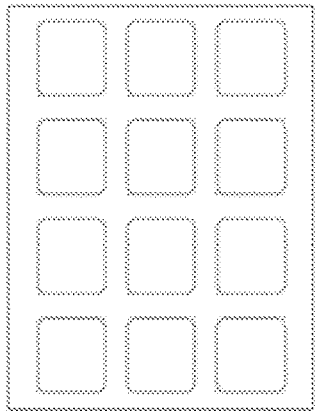
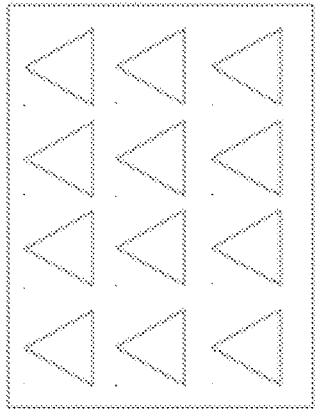
610 Original frame.
620 Half pixel Interpolation along x.
630 Half pixel Interpolation along y.
640 Half pixel Interpolation along x,y.
600 Some additional interpolated frames.
FIG. 6

700 An example of a complete Spatial Pyramid with L=2, N=2 and q=½.

700a An example of a partial Spatial Pyramid with L=2, N=2 and q=½.

800 An example of a complete Quincunx Spatial Pyramid with L=2 and q=½.

800a An example of a partial Quincunx Spatial Pyramid with L=2 and q=½.

900 An example of optical flow at odd levels k=(2m+1).

1000 An example of the up scaled optical flow of Fig. 9.

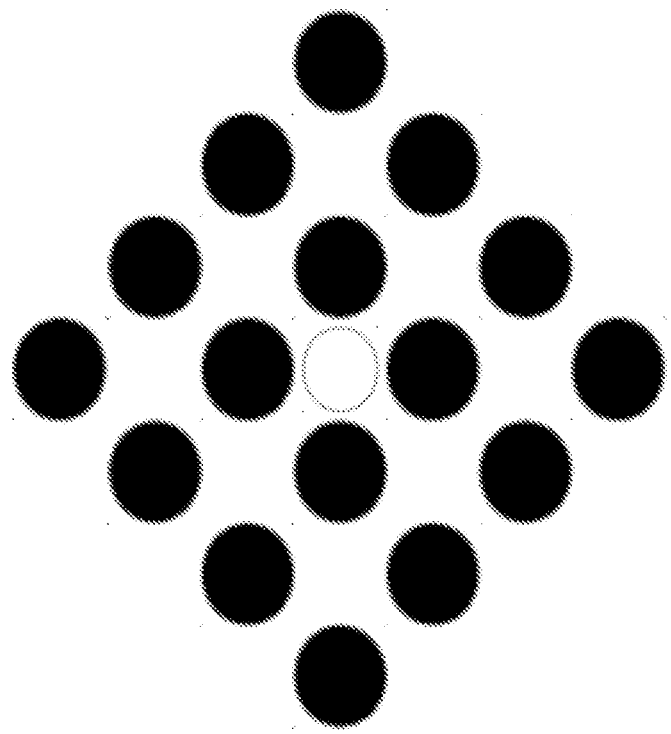
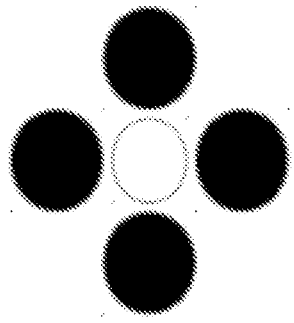
FIG. 11

PYRAMID ALGORITHM FOR VIDEO COMPRESSION AND VIDEO ANALYSIS

CROSS-REFERENCE TO RELATED PATENT APPLICATIONS

This patent application claims priority from and is related to U.S. Provisional Patent Application Ser. No. 62/336,770, filed on 16 May 2016, this U.S. Provisional Patent Application incorporated by reference in its entirety herein.

TECHNOLOGY FIELD

The present invention is in the field of video compression and video analysis.

BACKGROUND

A video consists of a sequence of frames, with a given spatial and temporal resolution. The spatial resolution is given by the number of pixels sampled along the x and y space directions, so called the number of columns and rows of the frame. The temporal resolution is given by the number of pixels sampled along the time direction so called the number of frames in the video. We can therefore view the sampled frame as a two dimensional rectangular lattice with corresponding sub-lattices as in FIG. 1, In diagram 110, we display the four Dyadic sub-lattices of the frame lattice, namely: the Dyadic-Even-Even sub-lattice of the Triangle pixels, the Dyadic-Even-Odd sub-lattice of the Diamond pixels, the Dyadic-Odd-Even sub-lattice of the Square pixels, and the Dyadic-Odd-Odd sub-lattice of the Star pixels. In diagram 120 we display the two Quincunx sub-lattices of the frame lattice, namely: the Quincunx-Even sub-lattice of the Black pixels and the Quincunx-Odd sub-lattice of the White pixels. Note that whereas the Dyadic sub-lattices are regular rectangular frame lattices as the original frame lattice is, the Quincunx sub-lattices are not. In order to make them regular, we can rotate them for example by 45° clockwise. In FIG. 2, we display the Quincunx-Even sub-lattice. Note that the un-rotated Quincunx-Even sub-lattice frame in diagram 210 is non rectangular. The rotated Quincunx-Even sub-lattice of diagram 220 is rectangular, but still not regular as the original frame lattice is because of the missing pixels on the four corners of the frame. In FIG. 3 we display the two Quincunx-Even's sub-lattices. As displayed in diagram 310, the Quincunx-Even-Even sub-lattice is denoted by 1, and the Quincunx-Even-Odd sub-lattice is denoted by 2. These Quincunx-Even's sub-lattices, as displayed in diagram 320, are again not regular frames because of the missing pixels at the four corners of the frame. In order to make them regular we need to un-rotate them counter clockwise by 45°. The resulting un-rotated Quincunx-Even's sub-lattices, displayed in diagram 330, now become regular rectangular frame lattices as the original frame lattice is. Note further that the Quincunx-Even-Even sub-lattice corresponds to the Dyadic-Even-Even sub-lattice, and that the Quincunx-Even-Odd sub-lattice corresponds to the Dyadic-Even-Odd sub-lattice. In FIG. 4, we display similarly the Quincunx-Odd sub-lattice. Note again that the un-rotated Quincunx-Odd sub-lattice frame in diagram 410 is non rectangular. The rotated Quincunx-Odd sub-lattice of diagram 420 is rectangular, but still not regular as the original frame lattice because of the missing pixels on the four corners of the frame. In FIG. 5, we display the two Quincunx-Odd's sub-lattices. As displayed in diagram 510, the Quincunx-Odd-Even sub-lattice is denoted by 3, and the Quincunx-Odd-Odd sub-lattice is denoted by 4. These Quincunx-Odd's sub-lattices, as displayed in diagram 520, are again not regular frames because of the missing pixels at the four corners of the frame. In order to make them regular we need to un-rotate them counter clockwise by 45°. The resulting un-rotated Quincunx-Odd's sub-lattices, displayed in diagram 530, now become regular frame lattices as the original frame lattice is. Here the Quincunx-Odd-Even sub-lattice corresponds to the Dyadic-Odd-Even sub-lattice, and the Quincunx-Odd-Odd sub-lattice corresponds to the Dyadic-Odd-Odd sub-lattice.

We therefore conclude that any two consecutive Quincunx down sampling operations correspond to one Dyadic down sampling operation, resulting in a regular frame lattice as the original frame lattice is.

SUMMARY

According to a first aspect of the present invention there is provided a method of representing image data comprising a spatial pyramid data structure of order L, the method comprising: providing an initial representation of the image data, the initial representation comprising an initial set of lattices of level 0; connecting each the lattices of level 0 to the image data; performing L reduction steps each comprising: for each one of at least one current lattice of a current level, optionally blurring the current lattice; providing a plurality of down sampled sub-lattices of the current optionally blurred lattice, the at least one current lattice being the parent lattice of the respective plurality of down sampled sub-lattices; and connecting the plurality of down sampled sub-lattices to the respective parent lattice, wherein the plurality of down sampled sub-lattices of the current level, comprise the set of current lattices for the next level.

The initial set of lattices may comprise fractional shifts of the image data.

The initial set of lattices may comprise only one lattice.

Providing down sampled sub-lattices may comprise performing down sampling using the Quincunx down sampling method.

The at least one current lattice may comprise all current lattices of the current level. According to a second aspect of the present invention there is provided a method of performing video compression, comprising: providing a set of N frames, and using the method of claim 1 to create a spatial pyramid structure of order L for each one of the frames in the set of N frames; providing another frame and creating a simple spatial pyramid data structure of order L for the another frame as follow: the another frame comprising the current lattice of level 0; performing L reduction steps each comprising: optionally blurring the current lattice; providing a down sampled sub-lattice of the current optionally blurred lattice, the current lattice being the parent lattice of the respective down sampled sub-lattice; connecting the down sampled sub-lattice to the respective parent lattice, wherein the down sampled sub-lattice of the current level, comprises the current lattice for the next level; wherein the set of N frames comprises a set of N already decoded frames and wherein the another frame comprises a current frame to be encoded and decoded; compressing/decompressing the lowest level lattice of the simple spatial pyramid using the N spatial pyramids, the decompressed lattice being the current decompressed lattice; performing L raise steps each comprising: computing the optical flows between the current decompressed lattice and the respective lattice of each of the N spatial pyramids; up scaling the optical flows to optical flows for the next higher level; predicting a decompressed lattice of the next higher level using the up scaled optical flows and the respective lattices of the N spatial pyramids; computing an enhancement data for the decompressed lattice using the respective lattice of the simple spatial pyramid; compressing/decompressing the enhancement data; adding the decompressed enhancement data to the decompressed lattice of the next higher level to create an enhanced decompressed lattice of the next higher level; and optionally deblurring the enhanced decompressed lattice of the next higher level to create the current decompressed lattice.

Predicting the decompressed lattice of the next higher level may comprise spatial and/or temporal prediction.

The N already decoded frames may comprise N already decoded frames of an original video, and wherein the current frame to be encoded and decoded comprises a new frame of the original video, wherein the creating the N spatial pyramids for the N frames, is performed in both the Encoder and Decoder; wherein the creating the simple spatial pyramid for the another frame is performed in the Encoder; wherein the compressing the lowest level lattice of the simple spatial pyramid is performed in the Encoder; the decompressing the compressed lowest level lattice is performed in both the Encoder and Decoder; wherein the performing L raise steps is performed in the Encoder/Decoder as follows: the computing the optical flows is performed in both the Encoder and Decoder; the up scaling of the optical flows is performed in both the Encoder and Decoder; the predicting the decompressed lattice of the next higher level is performed in both the Encoder and Decoder; the computing enhancement and the compressing of the enhancement data is performed in the Encoder; the decompressing of the compressed enhancement data is performed in both the Encoder and Decoder; and the adding the decompressed enhancement data and the optionally deblurring the enhanced decompressed lattice is performed in both the Encoder and Decoder.

Predicting the decompressed lattice of the next higher level may comprise spatial and/or temporal prediction.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1 is a diagram of a frame lattice and some of its sub-lattices;

FIG. 2 is a diagram of the Quincunx-Even sub-lattice;

FIG. 3 is a diagram of the Quincunx-Even's sub-lattices;

FIG. 4 is a diagram of the Quincunx-Odd sub-lattice;

FIG. 5 is a diagram of the Quincunx-Odds sub-lattices;

FIG. 6 is a diagram of some additional interpolated frames;

FIG. 11 is a diagram of an example of spatial pixel prediction.

DETAILED DESCRIPTION OF EMBODIMENTS

Figure 7:
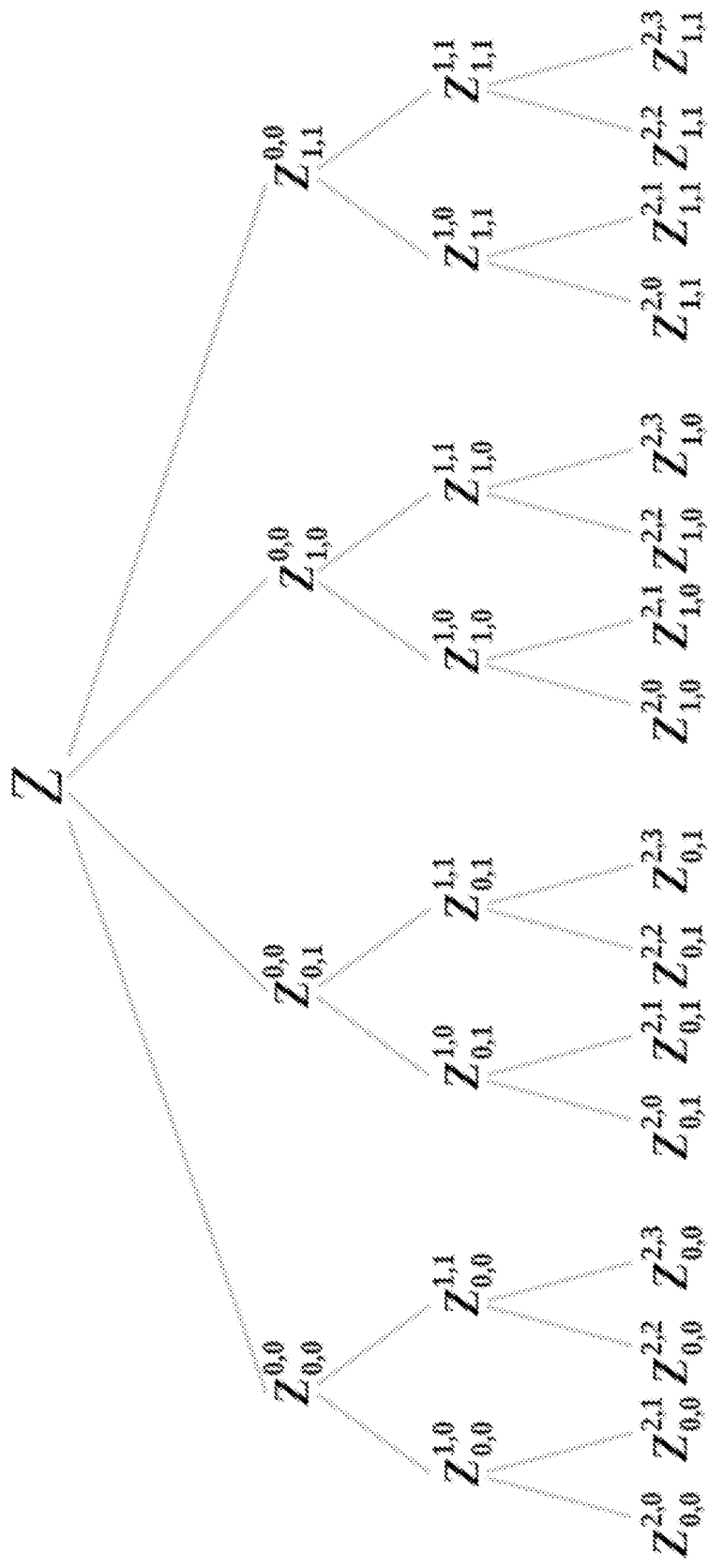
FIG. 7 is a diagram of an example of a complete Spatial Pyramid with L=2, N=2, and q=½.

In the present invention we present a new pyramid data structure and algorithms for video compression and video analysis.

The Spatial Pyramid of Sub-Lattices

A Spatial Pyramid is created using the current frame lattice and its related sub-lattices.

Initialization

We begin by creating additional frames of the same resolution as the original frame using interpolation. For example, we may interpolate the original frame by half pixel along the x (columns) direction, or by half pixel along the y (rows) direction or by half pixel along both the x and y directions. In FIG. 6, we show such possible half pixel interpolations. We assume here that the original frame, displayed in diagram 610, corresponds to the Dyadic down-sampled Triangle sub-lattice of the frame displayed in diagram 110 of FIG. 1. Then, half pixel interpolations of the original frame along the x direction, as displayed in diagram 620, correspond to the Dyadic down-sampled Square sub-lattice of the frame in diagram 110. Similarly, half pixel interpolations along the y direction as displayed in diagram 630, correspond to the Dyadic down-sampled Star sub-lattice of the frame in diagram 110, and half pixel interpolations along both the x and y directions, as displayed in diagram 640, correspond to the Dyadic down-sampled Diamond sub-lattice of the frame in diagram 110. We can similarly create additional frames by quarter pixel interpolation etc.

In general, let $$q = \frac{1}{p}$$

denotes the q-fractional interpolation method used to create the additional frames, and let Z denotes the original frame. Then we begin with a set of $p^2$ shifted frames of the same resolution as the original frame, which we denote as:

$$Z_{i,j}, 0 \leq i,j < p.$$

Here the i-index above represents the q-fractional interpolation of the original frame along the y-direction, and the j-index above represents similarly the q-fractional interpolation of the original frame along the x-direction. Hence, for example, frame $Z_{0,0}$ corresponds to the original frame Z, frame $Z_{1,0}$ corresponds to the frame resulting from $$q = \frac{1}{p}$$

fractional interpolation of the original frame Z along the y-direction, etc. We now define the Spatial Pyramid for this set of $p^2$ shifted frames as defined above. Let $L \geq 0$ be some integer defining the order of the Spatial Pyramid. Then we begin by denoting the 0-level of the pyramid by the set of lattices $$Z_{i,j}^{0,0} \equiv Z_{i,j}, 0 \leq i, j < p,$$

where the first top index represents the level number, and the second top index represents a global numbering for that lattice. We then connect each such lattice to the original frame, see for example FIG. 7, and FIG. 7a.

Now, assume we are using some down sampling method, such as Quincunx down sampling, Dyadic down sampling etc. Then, let N denote the number of sub-lattices for that method. For example, for the Quincunx down sampling method N=2, and for the Dyadic down sampling method N=4.

We now proceed to define the creation of the Spatial Pyramid of order L.

Step $k=0, \ldots, L-1$

We first optionally blur each frame lattice of level k to get the blurred frame lattices:

$$Z_{i,j}^{k,n_k} \to \tilde{Z}_{i,j}^{k,n_k}, \begin{cases} 0 \leq n_k < N^k \\ 0 \leq i, j < p \end{cases}$$

Next, given said above down sampling method, with N possible sub-lattices, we create all the possible sub-lattices for each of these optionally blurred frame lattices, namely:

$$\tilde{Z}_{i,j}^{k,n_k} \to Z_{i,j}^{k+1,n_k N+n}, \begin{cases} n = 0, \ldots, N-1 \\ 0 \leq n_k < N^k \\ 0 \leq i, j < p \end{cases}$$

Finally, we denote all these down-sampled sub-lattices as:

$$Z_{i,j}^{k+1,n_{k+1}}, \begin{cases} 0 \leq n_{k+1} < N^{k+1} \\ 0 \leq i, j < p \end{cases}$$

and call them the respective frame lattices of level (k+1).

The Pyramid Relations

We construct the Pyramid by connecting the frame lattices of each level, namely $$Z_{i,j}^{k,n_k}, \begin{cases} 0 \leq k < L \\ 0 \leq n_k < N^k \\ 0 \leq i, j < p \end{cases}$$

to their respective frame lattices of the next level, namely:

$$Z_{i,j}^{k+1,n_k N+n}, n = 0, \ldots, N-1, \begin{cases} 0 \leq k < L \\ 0 \leq n_k < N^k \\ 0 \leq i, j < p \end{cases}$$

In this context we define $\tilde{Z}_{i,j}^{k,n_k}$ to be the parent of $Z_{i,j}^{k+1,n_k N+n}$ and we denote this as $$\tilde{Z}_{i,j}^{k,n_k} = \text{Par}(Z_{i,j}^{k+1,n_k N+n}), n = 0, \ldots, N-1, \begin{cases} 0 \leq k < L \\ 0 \leq n_k < N^k \\ 0 \leq i, j < p \end{cases}$$

Figure 7A:
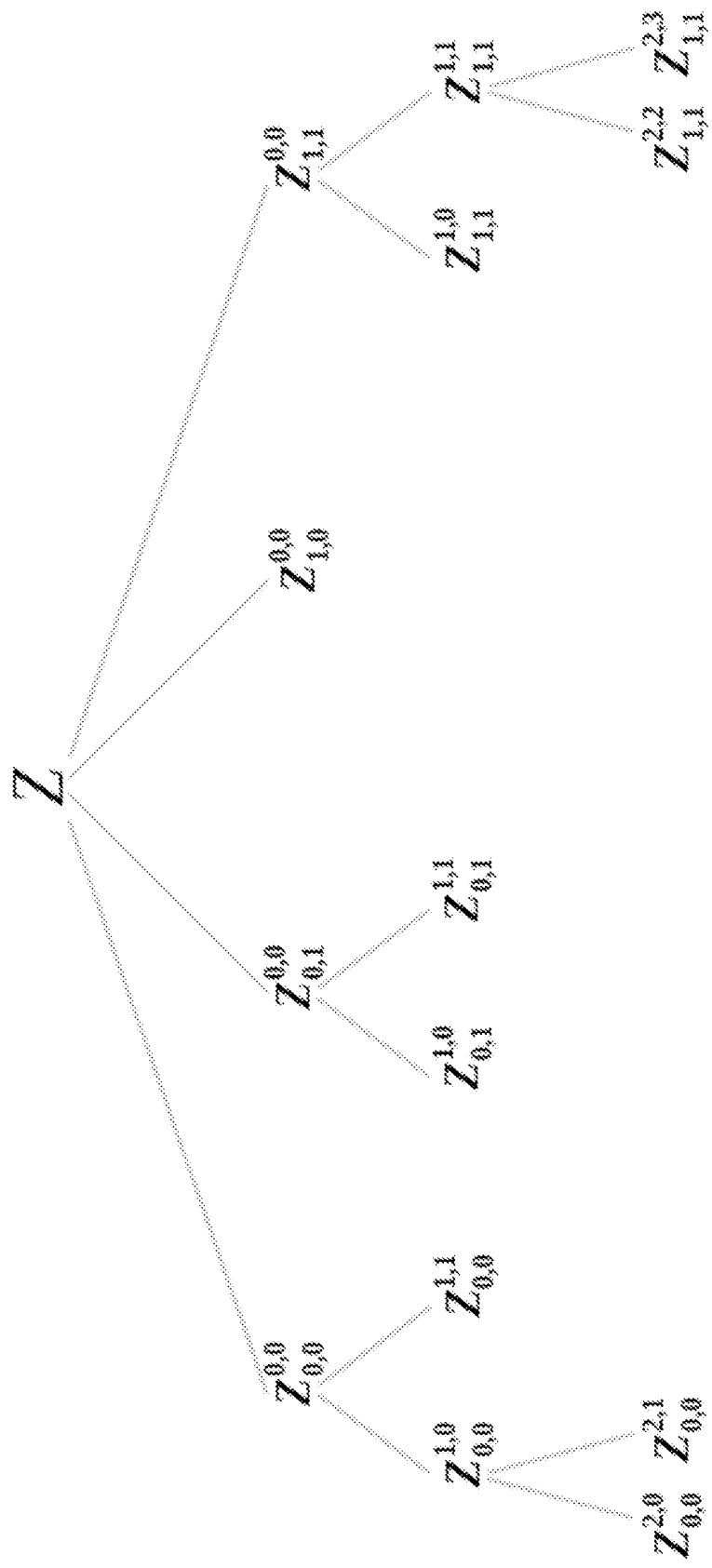
FIG. 7a is a diagram of an example of a partial Spatial Pyramid with L=2, N=2, and q=½.

An example of a complete Spatial Pyramid and its pyramid relations for L=2, N=2 and q=½ is depicted in FIG. 7. In practice, we can apply the reduction step to only some of the respective lattices of the corresponding level, yielding a partial Spatial Pyramid as for example depicted in FIG. 7a. for L=2, N=2, and q=½.

EXAMPLE

The Quincunx Spatial Pyramid

In this section we give a more concrete example of the Quincunx Spatial Pyramid.

Initialization

We begin by creating additional frames of the same resolution as the original frame using interpolation as was done in the previous section. Here, we let $q=2^{-p}$ denote the fractional interpolation method used to create the additional frames, so that the total number of initial frames is now $4^p$, namely:

$$Z_{i,j}, 0 \leq i, j < 2^p.$$

Here the index above represents again the q-fractional interpolation of the original frame along the y-direction, and the j-index above represents similarly the q-fractional interpolation of the original frame along the x-direction. Hence, for example, frame $Z_{0,0}$ corresponds to the original frame Z, frame $Z_{1,0}$ corresponds to the frame resulting from $q=2^{-p}$ fractional interpolation of the original frame Z along the y-direction, etc. We now use the Quincunx down sampling method to create the Quincunx Spatial Pyramid of order L using the following notations for level 0:

$$Z_{i,j}^0 \equiv Z_{i,j}, 0 \leq i, j < 2^p.$$

In what follows we assume the distances between the pixels of the original frame, along the x and the y directions, are the same, and are equal to 1. We now distinguish between Even and Odd steps as follows.

Even Step $k=0, 2, 4, \ldots$

Let the frame lattices of level k be denoted by $$Z_{i,j}^k, \begin{cases} 0 \leq i, j < 2^{m+p} \\ k = 2m \end{cases}$$

Here, we can assume by induction that the pixel distances along the x and the y directions are $(\sqrt{2})^k = 2^m$. Note also that the ith and jth indices of each such lattice correspond to the respective fractional shift of the top left pixel of that lattice with respect to the top left pixel of the original lattice.

Then, as in the previous section, we first optionally blur each such frame lattice to get the optionally blurred frame lattices:

$$Z_{i,j}^k \to \tilde{Z}_{i,j}^k, \begin{cases} 0 \leq i, j < 2^{m+p} \\ k = 2m \end{cases}$$

Then, we create for each of these optionally blurred lattices, the Quincunx-Even sub-lattice and the Quincunx-Odd sub-lattice which we denote as:

$$\tilde{Z}_{i,j}^k \to Z_{i,j}^{k+1}, Z_{i,j+2^{m+p}}^{k+1}, \begin{cases} 0 \le i, j < 2^{m+p} \\ k = 2m \end{cases}$$

Or more simply as:

$$Z_{i,j}^{k+1}, \begin{cases} 0 \le i < 2^{m+p} \\ 0 \le j < 2^{m+p+1} \\ k = 2m \end{cases}$$

Note that the ith and jth indices of each of these un-rotated Quincunx sub-lattices, as depicted in diagram 210 and diagram 410 respectively, correspond again to the fractional-shift of the top left pixels with respect to the top left pixel of the original frame. Furthermore, the pixel distances along the x and the y directions of these rotated Quincunx sub-lattices, as depicted in diagram 220 and diagram 420 respectively, are now $\sqrt{2}^{(k+1)} = \sqrt{2} * 2^m$. In this context we define similarly $\tilde{Z}_{i,j}^k$ to be the parent of these corresponding sub-lattices, and we denote this as:

$$\tilde{Z}_{i,j}^k = \frac{\text{Par}(Z_{i,j}^{k+1})}{\text{Par}(Z_{i,j+2^{m+p}}^{k+1})}, \begin{cases} 0 \le i, j < 2^{m+p} \\ k = 2m \end{cases}$$

Step k=1, 3, 5, . . .
Let the frame lattices of level k be denoted as above, i.e.

$$Z_{i,j}^k, \begin{cases} 0 \le i < 2^{m+p} \\ 0 \le j < 2^{m+p+1} \\ k = 2m + 1 \end{cases}$$

Then, as observed above, the pixel distances along the x and the y directions of these rotated Quincunx sub-lattices, as depicted in diagram 220 and diagram 420 respectively, are now $\sqrt{2}^k = \sqrt{2} * 2^m$. Similarly, the ith and jth indices of each of these un-rotated Quincunx sub-lattices, as depicted in diagram 210 and diagram 410 respectively, correspond to the fractional-shift of the top left pixels with respect to the top left pixel of the original frame.

Then, as in the previous section, we first optionally blur each such frame lattice to get the optionally blurred frame lattices:

$$Z_{i,j}^k \to \tilde{Z}_{i,j}^k, \begin{cases} 0 \le i < 2^{m+p} \\ 0 \le j < 2^{m+p+1} \\ k = 2m + 1 \end{cases}$$

Then, we create for each of these optionally blurred lattices, the Quincunx-Even sub-lattice and the Quincunx-Odd sub-lattice which we denote as:

$$\tilde{Z}_{i,j}^k \to Z_{i,j}^{k+1}, Z_{i+2^{m+p},(j+2^{m+p}) \bmod (2^{m+p+1})}^{k+1}, \begin{cases} 0 \le i < 2^{m+p} \\ 0 \le j < 2^{m+p+1} \\ k = 2m + 1 \end{cases}$$

Or more simply as $$Z_{i,j}^{k+1}, \begin{cases} 0 \le i, j < 2^{m+p+1} \\ k = 2m + 1 \end{cases}$$

Note that by now, these sub-lattices become regular rectangular lattices. The ith and jth indices of each of these lattices correspond again to the fractional-shift of the top left pixels with respect to the top left pixel of the original frame. Furthermore, the pixel distances along the x and the y directions are now $\sqrt{2}^{(k+1)} = 2^{m+1}$. In this context we define similarly $\tilde{Z}_{i,j}^k$ to be the parent of these corresponding sub-lattices, and we denote this as:

$$\tilde{Z}_{i,j}^k = \frac{\text{Par}(Z_{i,j}^{k+1})}{\text{Par}(Z_{i+2^{m+p},(j+2^{m+p}) \bmod (2^{m+p+1})}^{k+1})}, \begin{cases} 0 \le i < 2^{m+p} \\ 0 \le j < 2^{m+p+1} \\ k = 2m + 1 \end{cases}$$

To summarize, we can denote the frame lattices of each level as follows:
Step k=0, 1, . . . , 1

$$Z_{i,j}^k = \begin{cases} 0 \le i < 2^{k_1+p}, & k_1 = \left\lfloor \frac{k}{2} \right\rfloor \\ 0 \le j < 2^{k_2+p}, & k_2 = \left\lceil \frac{k}{2} \right\rceil \end{cases}$$

Figure 8:
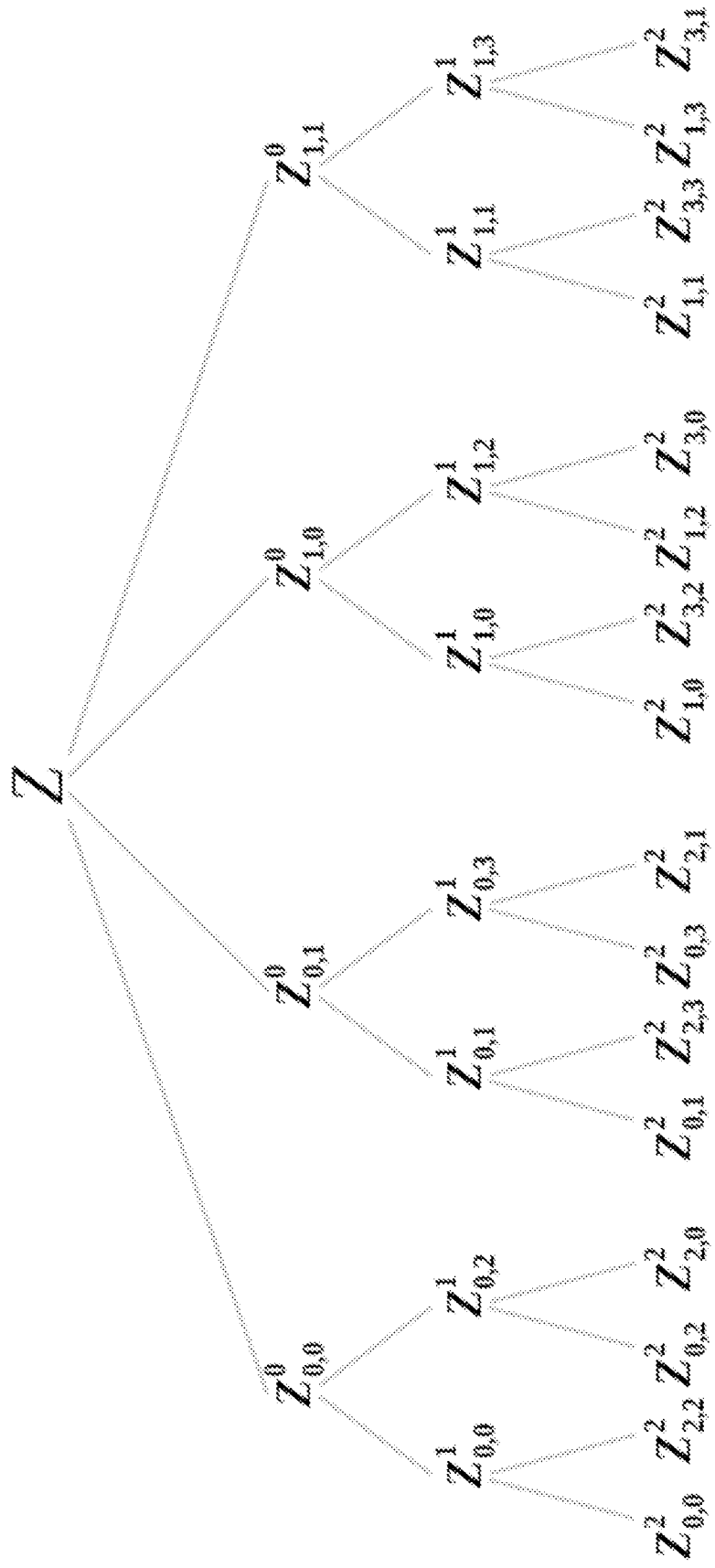
FIG. 8 is a diagram of an example of a complete Quincunx Spatial Pyramid with L=2, and q=½.
Figure 8A:
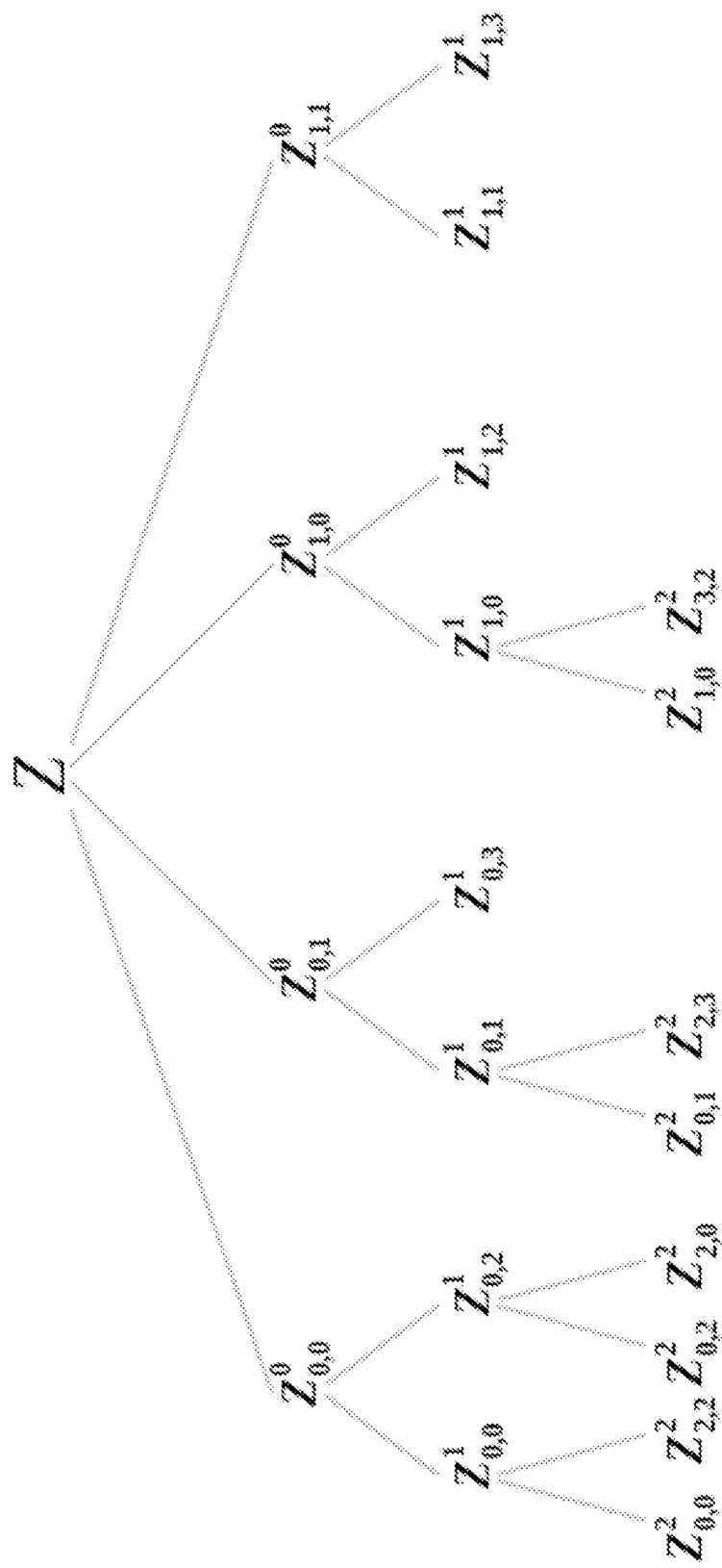
FIG. 8a is a diagram of an example of a partial Quincunx Spatial Pyramid with L=2, and q=½.

An example of a complete Quincunx Spatial Pyramid and its pyramid relations for L=2 and q=½ is depicted in FIG. 8. In practice, we can apply the reduction step to only some of the respective lattices of the corresponding level, yielding a partial Quincunx Pyramid as for example depicted in FIG. 8*a*. for L=2, and q=½.

An Application to Video Compression

In this section we describe the usage of the Spatial Pyramid in the context of video compression as discussed in the No Latency algorithm presented in Pat [1]. The Spatial Pyramid can also be used in the context of many other video compression algorithms such as the ones presented in Pat [2], and Pat [3], as well as with standard video compression algorithms such as MPEG, see Ref[1].
Introduction
We consider here the problem of encoding and decoding a sequence of video frames, in the order of their appearance. In particular, we do not consider here the problem of encoding and decoding the first frame in the sequence, but only any of the following frames in the sequence. We call the frame to be encoded and decoded the current frame, and assume that all the previously processed frames are known in their decoded form to both Encoder and Decoder. We now describe the process of encoding and decoding the current frame using the previously decoded frames. For simplicity, we use here only the last previously decoded frame, although more of the previously decoded frames can be used. Furthermore, for the purpose of presentation, we use here the Quincunx Spatial Pyramid and the Quincunx down sampling method.

Initialization

Let Y be the current frame to be encoded and decoded, let Z be the last previously decoded frame, and let L denotes the order of the Quincunx Spatial Pyramid to be used. Then we begin by creating a simple pyramid decomposition for $Y \equiv Y^0$ as follows: Iteratively perform the following step for k=0, 1, ..., L-1:

Optionally blur the frame lattice $Y^k$ and denote the optionally blurred lattice by $\tilde{Y}^k$. Then either Quincunx-Even down sample or Quincunx-Odd down sample this optionally blurred lattice and denote the resulting down sampled frame lattice as $Y^{k+1}$. We finally denote this whole resulting simple pyramid decomposition of Y by:

$$Y^k, \tilde{Y}^k \ 0 \leq k < L, Y^L.$$

We now create a corresponding Quincunx Spatial Pyramid of order L for the last previously decoded frame Z, as discussed in the previous section, in both the Encoder and the Decoder. To recap, given an initial parameter $p \geq 0$, we create the respective $4^p$ interpolated frames:

$$Z_{i,j}^0, 0 \leq i,j < 2^p.$$

Then, we create the corresponding optionally blurred lattices:

$$\tilde{Z}_{i,j}^k, 0 \leq k < L \begin{cases} 0 \leq i < 2^{k_1+p}, & k_1 = \lfloor \frac{k}{2} \rfloor \\ 0 \leq 1 < 2^{k_2+p}, & k_2 = \lceil \frac{k}{2} \rceil \end{cases}$$

where each such lattice of level k is optionally blurred in the same way as $\tilde{Y}^k$ was blurred. Finally we down sample each of these lattices, creating both the Quincunx-Even and Quincunx-Odd sub-lattices, which we then denote as:

$$Z_{i,j}^k, 0 < k \leq L \begin{cases} 0 \leq i < 2^{k_1+p}, & k_1 = \lfloor \frac{k}{2} \rfloor \\ 0 \leq 1 < 2^{k_2+p}, & k_2 = \lceil \frac{k}{2} \rceil \end{cases}.$$

The Algorithm

We encode and decode the current frame Y using the simple pyramid decomposition of Y and the respective Quincunx Spatial Pyramid of the last previously decoded frame Z as discussed above. Denoting by $\hat{Y}$ the resulting decoded current frame, we will obtain in the process a corresponding simple pyramid decomposition for $\hat{Y}$, i.e.

$$\hat{Y}^k, \hat{\tilde{Y}}^k \ 0 \leq k < L, \hat{Y}^L.$$

More precisely, we process the pyramids bottom up, in (L+1) steps, starting from the lowest level L of the pyramid up to the top most level 0 of the pyramid. On each such step we compress/decompress the respective pyramid lattice of Y of that level, yielding the respective pyramid lattice of the decoded frame it of that level. Therefore, by the end of the algorithm we obtain the required decoded frame it as proclaimed.

Step L: We Compress/Decompress $Y^L$.

1) In the Encoder, we compress $Y^L$ either directly using some known compression method such as Jpeg or Jpeg2000, or we compress $Y^L$ indirectly as follows: We inspect the lowest level lattices of the respective Z Quincunx Spatial Pyramid:

$$Z_{i,j}^L, \begin{cases} 0 \leq i < 2^{L_1+p}, & L_1 = \lfloor \frac{L}{2} \rfloor \\ 0 \leq j < 2^{L_2+p}, & L_2 = \lceil \frac{L}{2} \rceil \end{cases}$$

and choose the one, say $Z_{i_0,j_0}^L$, which best approximates $Y^L$. Then we compress the difference between that lattice and $Y^L$, namely $D^L = Y^L - Z_{i_0,j_0}^L$, using any known compression method such as for example wavelet based compression methods, see for example Ref[3]. The Encoder then sends the respective compressed bit stream to the Decoder. In the first case above (direct compression of $Y^L$), the bit stream consists of the compressed lattice $\hat{Y}^L$. In the second case above (compression of the difference between that lattice and $Y^L$), the bit stream consists of the compressed lattices' difference $\hat{D}^L$ together with the indices $i_0$, $j_0$.

2) In the Decoder, as well as in the Encoder, we now reconstruct the compressed lattice $\hat{Y}^L$. In the first case above we decompress the bit stream to obtain $\hat{Y}^L$ directly. In the second case above we decompress the bit stream to obtain the compressed lattices' difference $\hat{D}^L$, and then use the transmitted indices $i_0$, $j_0$ to obtain $\hat{Y}^L$ by computing $\hat{Y}^L = \hat{D}^L + Z_{i_0,j_0}^L$.

Step k=L-1, ..., 0: We may now now assume by induction, that we have already processed all the Y pyramid lattices of level m>k, namely:

$$i \ Y^L, Y^m, \tilde{Y}^m \ m=L-1,\ldots,k+1.$$

and obtained the respective pyramid lattices of $\hat{Y}$, namely:

$$\hat{Y}^L, \hat{Y}^m, \hat{\tilde{Y}}^m \ m=L-1,\ldots,k+1.$$

We now show how to proceed and obtain $\hat{Y}^k$ and $\hat{\tilde{Y}}^k$ from that respect pyramid of lattices of $\hat{Y}$ and $Y^k$ and $\tilde{Y}^k$. Hence, by the end of the algorithm we obtain the decoded frame $\hat{Y} \equiv \hat{Y}^0$ as required.

1) In both the Encoder and Decoder, we first compute the optical flows, see Ref[2], between the lattice $\hat{Y}^{k+1}$ and each of the respective lattices of level (k+1) of the Z Quincunx Spatial Pyramid:

$$F_{i,j}^{k+1} = OpticalFlow(\hat{Y}^{k+1} \to Z_{i,j}^{k+1}), \begin{cases} 0 \leq i < 2^{k_1+p}, & k_1 = \lfloor \frac{k+1}{2} \rfloor \\ 0 \leq j < 2^{k_2+p}, & k_2 = \lceil \frac{k+1}{2} \rceil \end{cases}$$

2) Let $\overline{Y}^k$ denote some proposed lattice with the same resolution as $Y^k$ and for which the lattice $\hat{Y}^{k+1}$ is its respective sub-lattice. Note that about half of the pixels in $\overline{Y}^k$ are yet unknown but they will be defined later on.

3) In both the Encoder and Decoder, we then upscale the optical flows constructed in 1) above, to respective proposed optical flows between the proposed lattice $\overline{Y}^k$ and each of the respective optionally blurred lattices of the Z Quincunx Spatial Pyramid of that level, namely, $$\overline{F}_{i,j}^k = OpticalFlow(\overline{Y}^k \to \tilde{Z}_{i,j}^k), \begin{cases} 0 \le i < 2^{k_1+p}, & k_1 = \left\lfloor \frac{k}{2} \right\rfloor \\ 0 \le j < 2^{k_2+p}, & k_2 = \left\lceil \frac{k}{2} \right\rceil \end{cases}$$

Figure 9:
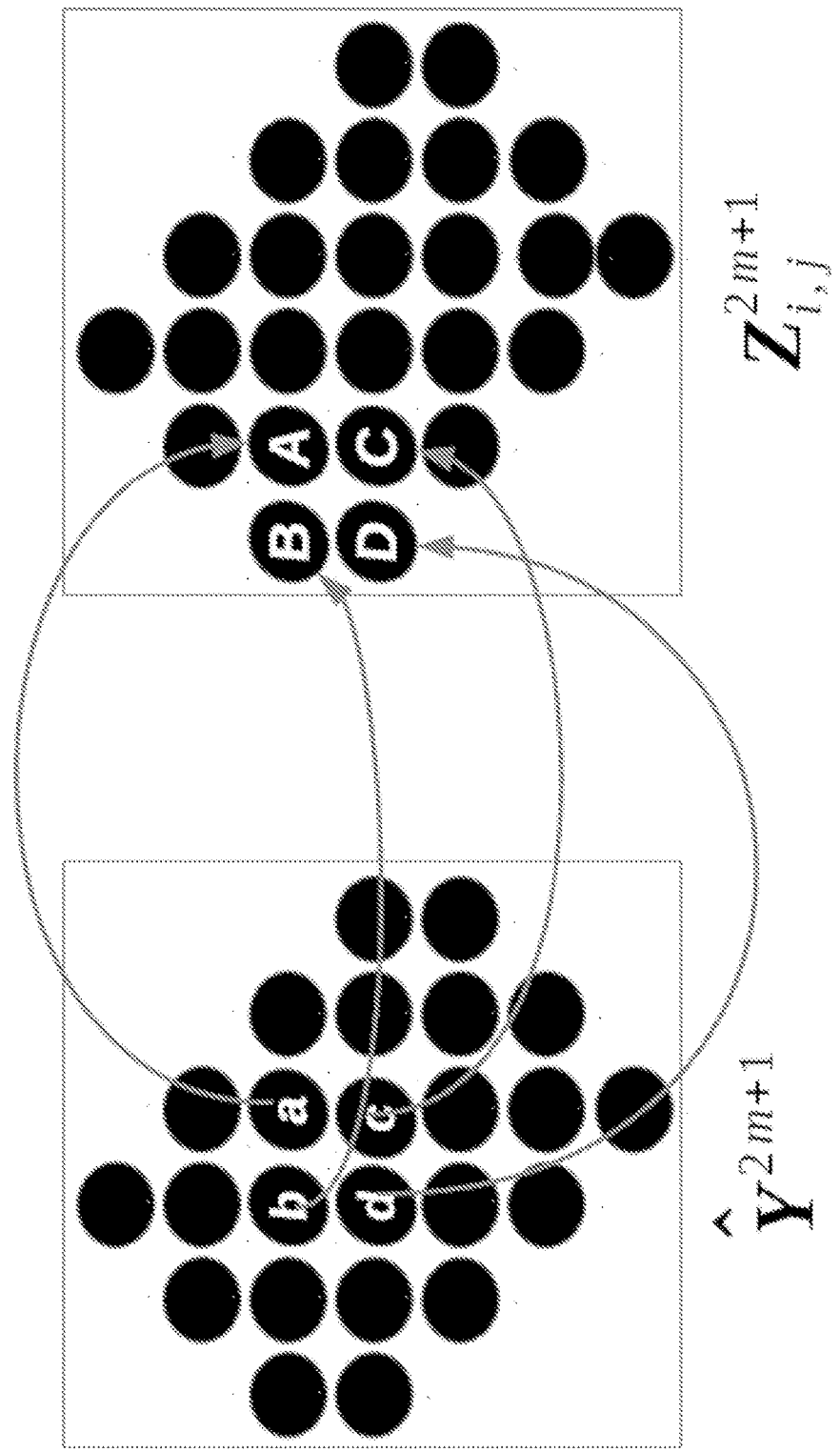
FIG. 9 is a diagram of an example of optical flow at odd levels k=(2m+1)
Figure 10:
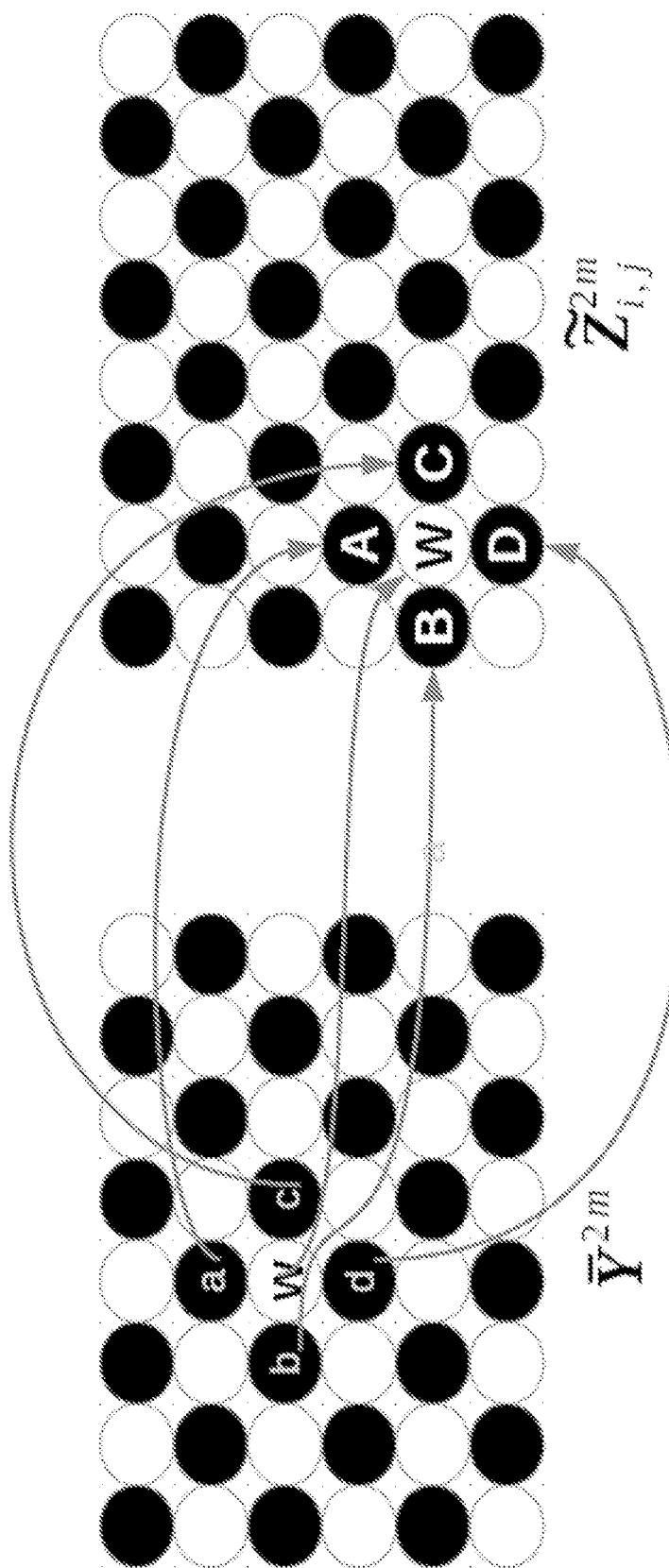
FIG. 10 is a diagram of an example of the up scaled optical flow of FIG. 9.

This can be done for example as follows: Suppose k=2m is an even level, and the optical flow between the lattice $\hat{Y}^{k+1}$ and the lattice $Z_{i,j}^{k+1}$ as computed in 1) above is given for example by FIG. 9. Then, since by the definition, the lattice $\hat{Y}^{k+1}$ is a sub-lattice of lattice $\overline{Y}^k$, then the optical flow for the Black pixels in lattice $\overline{Y}^k$ is already known, see FIG. 10. It therefore remains only to compute the optical flow for the White pixels in FIG. 10. However, every "White" pixel in $\overline{Y}^k$ is surrounded by four neighboring Black pixels for which the optical flow is already known. Therefore we can use this information to predict an optical flow for the surrounded White pixel of that neighborhood. For example, we can average the surrounding optical flows to get that value. In FIG. 10, the optical flow for the "White" pixel denoted by w, is therefore predicted by the average of the optical flows for pixels a,b,c and d, yielding the pixel denoted by W.

4) In both the Encoder and Decoder, we now complete the definition of $\overline{Y}^k$ as follows. First we note that again since $\hat{Y}^{k+1}$ is a sub-lattice of $\overline{Y}^k$, we already know half of the pixels of $\overline{Y}^k$, for example the Black pixels in FIG. 10. Next, to compute the remaining pixels, we can use spatial and/or temporal prediction.

5) Spatial prediction: We use the known pixel values of $\overline{Y}^k$ to predict the remaining pixel values of $\overline{Y}^k$. For example, we may look at a pixel's 4 surrounding neighbors as in diagram 1110 of FIG. 11, or at a pixel's 16 surroundings neighbors as in diagram 1120 of FIG. 11, etc. Using these surrounding neighbors we may now predict the White pixel value using averaging, interpolation, etc.

6) Temporal prediction: We use the computed proposed optical flows between the lattice $\overline{Y}^k$ and the respective lattices $\tilde{Z}_{i,j}^k$ of the Quincunx Spatial Pyramid of Z, computed in 3) above, to predict the missing pixels. For example, in FIG. 10, we can predict the value of the White pixel w in $\overline{Y}^k$ from the corresponding value W in $\tilde{Z}_{i,j}^k$.

7) By now, we have completely defined the lattice $\overline{Y}^k$ which should be an approximation to the lattice of $\hat{Y}^k$. In practice, however, not all pixels in $\overline{Y}^k$ are good predictions to the corresponding pixels in $\hat{Y}^k$. Therefore, some corrections are needed. Accordingly, in the Encoder, we may now compute the difference $$D^k = \hat{Y}^k - \overline{Y}^k,$$

and decide to improve the values of some of the pixels in the so predicted lattice $\overline{Y}^k$. For example, we can compress that difference, using some known compression method, and send the compressed bit stream to the Decoder.

8) In the Decoder and the Encoder, we then decompress the respective bit stream to obtain $\hat{D}^k$. Finally, in both the Decoder and the Encoder we add that compressed difference to compute $\hat{\hat{Y}}^k = \hat{D}^k + \overline{Y}^k$.

9) in both the Decoder and Encoder we compute $\hat{Y}^k$ by de-blurring $\hat{\hat{Y}}^k$.

The Compressed Bit Stream

The compressed bit stream consists of the aggregate compressed bit streams for:

$\hat{Y}^L$ as computed in 1) of Step L above; and for $\hat{D}^k$, k=L-1, . . . , 0, as computed in 7) of Step k above.

REFERENCE

Ref[1] https://en.wikipedia.org/wiki/Moving_Picture_Experts_Group.
Ref[2] https://en.wikipedia.org/wiki/Optical_flow.
Ref[3] https://en.wikipedia.org/wiki/Embedded_Zerotrees_of_Wavelet_transforms.

Patents

Pat [1] Ilan Bar-On and Oleg Kostenko, Multi-Level Spatial-Temporal Resolution Increase of Video, App. No. PCT/I82014/062524
Pat [2] Ilan Bar-On and Oleg Kostenko, Video Compression Method, App. No. PCT/I82013/059007
Pat [3] Ilan Bar-On and Oleg Kostenko, A New Universal Video Codec, App. No. PCT/IB2015/054735.

The invention claimed is:

1. A method of representing image data comprising a spatial pyramid data structure of order L, the method comprising:
   providing an initial representation of the image data, the initial representation comprising an initial set of current lattices of a current level, each one of said set of current lattices comprising an interpolated image of said image data and having the same resolution as that of said image data;
   connecting each of the current lattices to the image data;
   performing L reduction steps, each comprising:
   a. optionally blurring at least one current lattice of the current level;
   b. providing a plurality of down sampled sub-lattices of the optionally blurred at least one current lattice, the at least one current lattice being the parent lattice of the respective plurality of down sampled sub-lattices; and
   c. connecting the plurality of down sampled sub-lattices to the respective parent lattice,
   wherein the plurality of down sampled sub-lattices of the current level, comprise the set of current lattices for the next level.

2. The method of claim 1, wherein the initial set of lattices comprises fractional shifts of the image data.

3. The method of claim 1, wherein the initial set of lattices comprises only one lattice.

4. The method of claim 1, wherein the providing down sampled sub-lattices comprises performing down sampling using the Quincunx down sampling method.

5. The method of claim 1, wherein the at least one current lattice comprises all current lattices of the current level.

6. A method of performing video compression of an input original video yielding an output compressed Bit Stream, comprising:
   (i) providing a set of N reconstructed frames of said original video, and creating a "spatial pyramid" data structure of order L for each frame of said reconstructed frames, using the steps of:
   providing an initial representation of the frame data, the initial representation comprising an initial set of current lattices of a current level;

connecting each of the current lattices to said frame data;
performing L reduction steps, each comprising:
  a. optionally blurring at least one current lattice of the current level;
  b. providing a plurality of down sampled sub lattices of the optionally blurred at least one current lattice, the at least one current lattice being the parent lattice of the respective plurality of down sampled sub-lattices; and
  c. connecting the plurality of down sampled sub-lattices to the respective parent lattice,
wherein the plurality of down sampled sub-lattices of the current level, comprises the set of current lattices for the next level;
(ii) providing a new original frame of said original video and creating a "simple pyramid" data structure of order L for said new original frame, comprising:
setting said new frame as the current original lattice of the current level;
performing L reduction steps each comprising:
  a. optionally blurring the current original lattice of the current level;
  b. providing a down sampled sub-lattice of the current optionally blurred original lattice; the current original lattice being the parent lattice of the respective down sampled sub-lattice; and
  c. connecting the down sampled sub-lattice to the respective parent original lattice, wherein the down sampled sub-lattice of the current level, comprises the current original lattice for the next level;
iii. reconstructing the lowest level lattice of said "simple pyramid", comprising:
  a. predicting said lowest level lattice using said lowest level sets of lattices of said N "spatial pyramids";
  b. compressing the difference between said respective original lattice and said predicted lattice of said lowest level "simple pyramid"; and initializing the Bit Stream with said compressed difference;
  c. decompressing said compressed difference; and
  d. adding said decompressed difference to said predicted lattice, yielding the reconstructed lowest level lattice of said "simple pyramid";
iv. performing L raise steps, each comprising:
  a. computing the optical flows between the reconstructed lattice of the current level and each of the lattices of the respective level in said N "spatial pyramids";
  b. up scaling the optical flows of the current level to predicted optical flows for the next higher level, wherein said predicted optical flows for the next higher level comprise predicted optical flows between the original lattice of the next higher level of the "simple pyramid" and each of the lattices of the respective next higher level of said N "spatial pyramids";
  c. predicting the parent lattice of said current lattice using said up scaled optical flows and said lattice of the current level; and setting said next higher level to be the current level;
  d. compressing the difference between the respective original lattice and said predicted lattice of the current level of said "simple pyramid"; and inserting said compressed difference to the Bit Stream; and
  e. decompressing said compressed difference and adding said difference to the predicted lattice, yielding the reconstructed lattice of the current level of said "simple pyramid".

7. The method of claim 6 where the predicting the decompressed lattice of the next higher level comprises one of spatial and temporal prediction.

8. A method of performing video decompression of a compressed original video, given an input Bit Stream, yielding an output reconstructed video, of said original video, comprising:
  i. providing a set of N reconstructed frames of said original video and creating a "spatial pyramid" data structure of order L for each frame of said N reconstructed frames, using the steps of:
providing an initial representation of the frame data, the initial representation comprising an initial set of current lattices of a current level; connecting each of the current lattices to said frame data; performing L reduction steps, each comprising:
  a. optionally blurring at least one current lattice of the current level;
  b. providing a plurality of down sampled sub-lattices of the optionally blurred at least one current lattice, the at least one current lattice being the parent lattice of the respective plurality of down sampled sub-lattices; and
  c. connecting the plurality of down sampled sub-lattices to the respective parent lattice;
wherein the plurality of down sampled sub-lattices of the current level comprise the set of current lattices for the next level;
(ii) providing a new compressed frame of said original video in said input Bit Stream, said compressed frame representing a compressed "simple pyramid" data structure of order L, comprising the compressed differences between the original lattice and the predicted lattice of each level, starting from the lowest level L, to the topmost level 0,
iii. reconstructing the lowest level lattice of said "simple pyramid", comprising:
  a. predicting said lowest level lattice using said lowest level sets of lattices of said N "spatial pyramids";
  b. extracting said compressed lowest level difference between the original lattice and said predicted lattice of the lowest level of said "simple pyramid" from the Bit Stream;
  c. decompressing said compressed lowest level difference; and
  d. adding said decompressed difference to said predicted lattice, yielding the reconstructed lowest level lattice of said "simple pyramid";
iv. performing L raise steps each comprising:
  a. computing the optical flows between the reconstructed lattice of the current level and each of the lattices of the respective level in said N "spatial pyramids";
  b. up scaling the optical flows of the current level to predicted optical flows for the next higher level, wherein said predicted optical flows for the next higher level comprise predicted optical flows between the original lattice of the next higher level of the "simple pyramid" and each of the lattices of the respective next higher level of said N "spatial pyramids";
  c. predicting the parent lattice of said current lattice using said up scaled optical flows and said lattice of the current level; and setting said next higher level to be the current level;

d. extracting the compressed difference between the original lattice and said predicted lattice of the current level of said "simple pyramid" from the Bit Stream; and
e. decompressing said compressed difference and adding said difference to the predicted lattice, yielding the reconstructed lattice of the current level of said "simple pyramid".

9. The method of claim 8 where the predicting the parent lattice comprises one of spatial and temporal prediction.

* * * * *